(12) United States Patent
Reed et al.

(10) Patent No.: US 7,716,429 B2
(45) Date of Patent: May 11, 2010

(54) APPARATUS, SYSTEM, AND METHOD FOR DYNAMIC ADDRESS TRACKING

(75) Inventors: David Charles Reed, Tucson, AZ (US); Jeffrey Thomas Sheridan, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 11/855,881

(22) Filed: Sep. 14, 2007

(65) Prior Publication Data

US 2009/0077554 A1    Mar. 19, 2009

(51) Int. Cl.
    *G06F 12/00*   (2006.01)
(52) U.S. Cl. ..................................... 711/154
(58) Field of Classification Search ....................... None
    See application file for complete search history.

(56) References Cited

U.S. PATENT DOCUMENTS

| 6,289,368 B1 | 9/2001 | Dentler | |
|---|---|---|---|
| 2004/0039971 A1 | 2/2004 | Bakke | 714/56 |
| 2005/0015437 A1 | 1/2005 | Strait | |
| 2005/0222689 A1 | 10/2005 | Smith | |
| 2006/0075195 A1 | 4/2006 | Stevens | 711/145 |
| 2006/0168584 A1 | 7/2006 | Dawson | |
| 2007/0067368 A1 | 3/2007 | Choi et al. | 707/205 |
| 2007/0074082 A1 | 3/2007 | Thangaraj | |

FOREIGN PATENT DOCUMENTS

EP    1471441 A1    10/2004

OTHER PUBLICATIONS

PCT/EP2008/061683, International Search Report and Written Opinion, Mar. 3, 3009.

*Primary Examiner*—Hiep T Nguyen
(74) *Attorney, Agent, or Firm*—Kunzler Needham Massey & Thorpe (57) ABSTRACT

An apparatus, system, and method are disclosed for dynamic address tracking. A token module creates a token for a job that accesses data in a storage system comprising a plurality of storage devices. The token comprises a job name. The job is a batch job. A storage module stores location information for the data accessed by the job in a token table. The location information is indexed by the token. In addition, the location information includes an input/output device name, an address space, a data set name, and a storage device name. A communication module receives a diagnostic command comprising the job name. The token module reconstructs the token using the job name. The storage module retrieves the location information indexed by the token in response to the diagnostic command.

30 Claims, 8 Drawing Sheets

700

| | Token | I/O Device Name | Address Space | Data Set Name | Storage Device Name |
|---|---|---|---|---|---|
| 705a | Token 710a | I/O Device Name 715a | Address Space 720a | Data Set Name 725a | Storage Device Name 730a |
| 705b | Token 710b | I/O Device Name 715b | Address Space 720b | Data Set Name 725b | Storage Device Name 730b |
| 705c | Token 710c | I/O Device Name 715c | Address Space 720c | Data Set Name 725c | Storage Device Name 730c |
| 705d | Token 710d | I/O Device Name 715d | Address Space 720d | Data Set Name 725d | Storage Device Name 730d |

| Job Name |
| --- |
| 405 |

| Job Name | System Name |
| --- | --- |
| 405 | 410 |

| Token | I/O Device Name | Address Space | Data Set Name | Storage Device Name |
|---|---|---|---|---|
| Token 710a | I/O Device Name 715a | Address Space 720a | Data Set Name 725a | Storage Device Name 730a |
| Token 710b | I/O Device Name 715b | Address Space 720b | Data Set Name 725b | Storage Device Name 730b |
| Token 710c | I/O Device Name 715c | Address Space 720c | Data Set Name 725c | Storage Device Name 730c |
| Token 710d | I/O Device Name 715d | Address Space 720d | Data Set Name 725d | Storage Device Name 730d |

| B27349 705a | IST3297, IST3298 715a | 013A, BD92 720a | CustomerDB, TransactionDB 725a | DD972 730a | HH301 805a |
| B27350 705b | IST3292 715b | 007B5124100 720b | BillingDB 725b | DD962 730b | HH302 805b |

APPARATUS, SYSTEM, AND METHOD FOR DYNAMIC ADDRESS TRACKING

BACKGROUND OF THE INVENTION

1. Field of the Invention

This invention relates to address tracking and more particularly relates to dynamic address tracking.

2. Description of the Related Art

Enterprise data processing systems frequently include storage systems. A storage system may include a plurality of storage devices and multiple input/output (I/O) devices distributed over one or more sites.

A host may access data from a storage device of the storage system. Often, the host may access the data as part of a batch job. A plurality of hosts may concurrently access the storage system.

When there is an error accessing data in the data for a storage system, an administrator may wish to trace the input and output accesses to the data. Unfortunately because of the large number of storage devices and I/O devices involved in a storage system, a job trace and/or a data dump may be impossible to perform for a batch job without knowing in advance which address spaces, I/O devices, and storage devices are being used.

SUMMARY OF THE INVENTION

From the foregoing discussion, there is a need for an apparatus, system, and method that dynamically tracks addresses. Beneficially, such an apparatus, system, and method would support data dumps and I/O tracing.

The present invention has been developed in response to the present state of the art, and in particular, in response to the problems and needs in the art that have not yet been fully solved by currently available address tracking methods. Accordingly, the present invention has been developed to provide an apparatus, system, and method for dynamically tracking addresses that overcome many or all of the above-discussed shortcomings in the art.

The apparatus to dynamically track addresses is provided with a plurality of modules configured to functionally execute the steps of creating a token, storing location information, receiving a diagnostic command, reconstructing the token, and retrieving the location information. These modules in the described embodiments include a token module, a storage module, and a communication module. In one embodiment, the apparatus includes a presentation module.

The token module creates a token for a job that accesses data in a storage system. The storage system comprises a plurality of storage devices. The token comprises a job name. The job is a batch job.

The storage module stores location information for the data accessed by the job in a token table. The location information is indexed by the token. In addition, the location information includes an I/O device name, an address space, a data set name, and a storage device name.

The communication module receives a diagnostic command comprising the job name. The token module reconstructs the token using the job name. The storage module retrieves the location information indexed by the token in response to the diagnostic command.

A system of the present invention is also presented to dynamically track addresses. The system may be embodied in a data processing system. In particular, the system, in one embodiment, includes a host, a storage system, and a server. The storage system includes a plurality of storage devices. The storage device stores data sets for the host. The server includes computable computer readable programs stored in a tangible storage device and executed by a processor. The computer readable programs include a token module, a storage module, and a communication module.

The token module creates a token for a job that accesses data in the storage system. The token comprises a job name. The job is a batch job.

The storage module stores location information for the data accessed by the job in a token table. The location information is indexed by the token. In addition, the location information includes an I/O device name, an address space, a data set name, and a storage device name.

The communication module receives a diagnostic command comprising the job name. The token module reconstructs the token using the job name. The storage module retrieves the location information indexed by the token in response to the diagnostic command. In one embodiment, the presentation module lists the retrieved location information as a diagnostic data dump.

A method of the present invention is also presented for dynamically tracking addresses. The method in the disclosed embodiments substantially includes the steps to carry out the functions presented above with respect to the operation of the described apparatus and system. In one embodiment, the method includes creating a token, storing location information, receiving a diagnostic command, reconstructing the token, and retrieving the location information.

A token module creates a token for a job that accesses data in a storage system comprising a plurality of storage devices. The token comprises a job name. The job is a batch job.

A storage module stores location information for the data accessed by the job in a token table. The location information is indexed by the token. In addition, the location information includes an I/O device name, an address space, a data set name, and a storage device name.

A communication module receives a diagnostic command comprising the job name. The token module reconstructs the token using the job name. The storage module retrieves the location information indexed by the token in response to the diagnostic command.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention employs a token table to dynamically track address spaces. In addition, the present invention may support data dumps and job traces using the token table. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
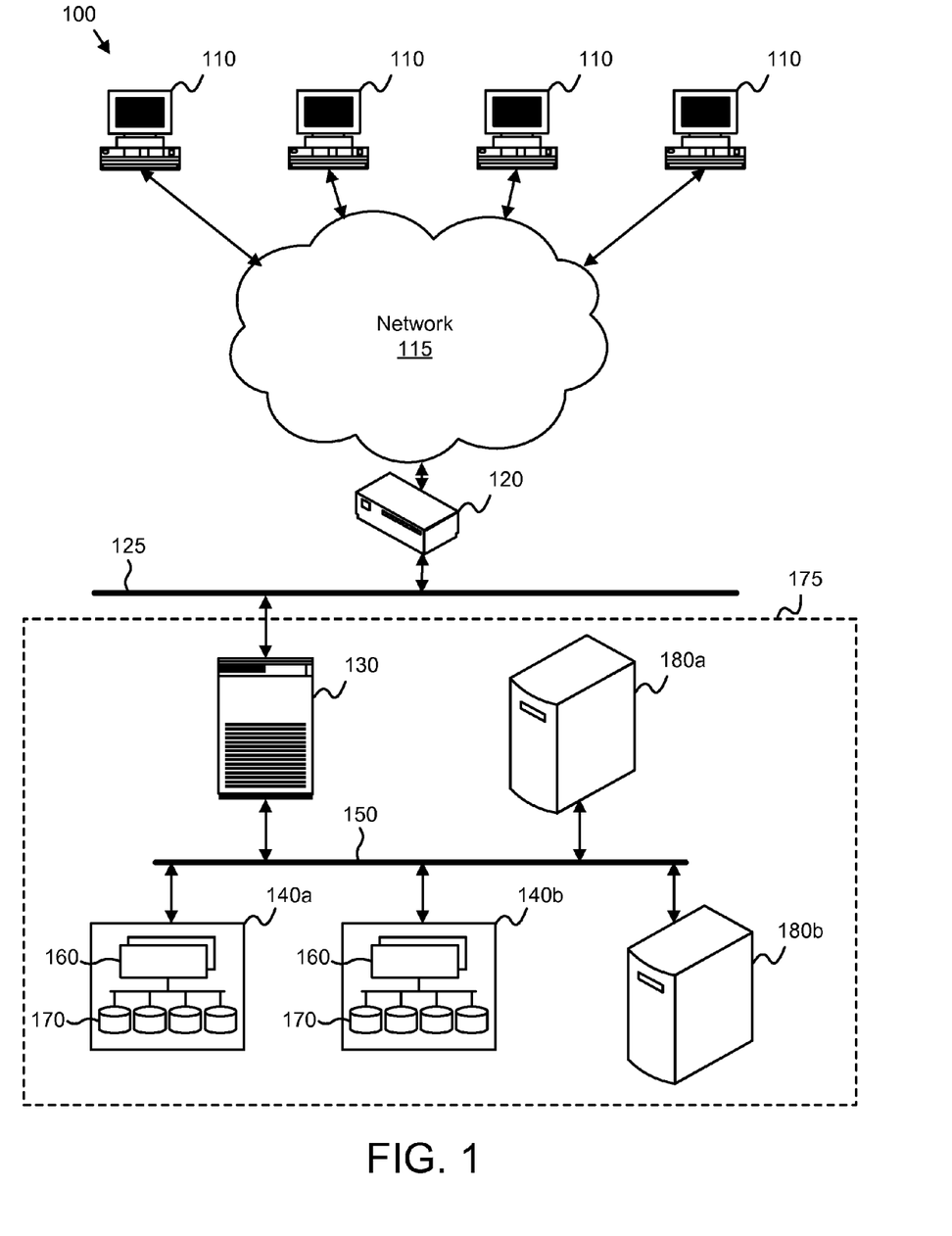
FIG. 1 is a schematic block diagram illustrating one embodiment of a data processing system in accordance with the present invention.

FIG. 1 is a schematic block diagram illustrating one embodiment of a data processing system (DPS) 100 in accordance with the present invention. The DPS 100 includes one or more host computers 110, a network 115, a router 120, an internal network 125, a server 130, a storage communications channel 150, one or more storage subsystems 140, and one or more tape drives 180. The server 130, storage communications channel 150, storage subsystems 140 and tape drives 180 may embody a storage system 175.

As used herein, the host computers 110 are referred to as hosts 110. The server 130 may also be configured as a mainframe computer, a blade center comprising multiple blade servers, and the like. Although for simplicity four hosts 110, one network 115, one router 120, one internal network 125, one server 130, one storage communications channel 150, and two storage subsystems 140 are shown, any number of hosts 110, networks 115, routers 120, internal networks 125, servers 130, storage communications channels 150 and storage subsystems 140 may be employed. One of skill in the art will also readily recognize that the DPS 100 could include other data processing devices such as bridges, scanners, printers, and the like.

Each storage subsystem 140 includes one or more storage controllers 160 and one or more storage devices 170. The storage devices 170 may be hard disk drives, optical storage devices, micromechanical storage devices, holographic storage devices, and semiconductor storage devices. The tape drives 180 may also be referred to generically as storage devices 170. Alternatively, the storage devices 170 may also be configured as a just a bunch of disks (JBOD), a redundant array of independent disks (RAID), a tape library, a storage subsystem, a tape backup, a tape library, a compact disk read only memory (CD ROM) library, and the like.

In one embodiment, the DPS 100 provides data storage and data manipulation services for the hosts 110. For example, a host 110 may access data stored on a storage device 170 of a storage subsystem 140 by communicating a request through the network 115, the router 120, the internal network 125, the server 130, and the storage communications channel 150 to a storage controller 160 for the storage device 170. The storage controller 160 may retrieve the data from the storage device 170 and communicate the data to the host 110. In one embodiment, the server 130 may execute a database application used by the host 110 to access the data.

The network 115 connecting the hosts 110 and the server 130 may be selected from a local area network (LAN), a wide area network (WAN), the Internet, an Ethernet network, a token ring network, or the like. The network 115 may comprise one or more nodes those may provide one or more physical and/or logical paths for transferring the data. The internal network 125 and the storage communications channel 150 may be for example a LAN, a WAN, or the like.

Figure 2:
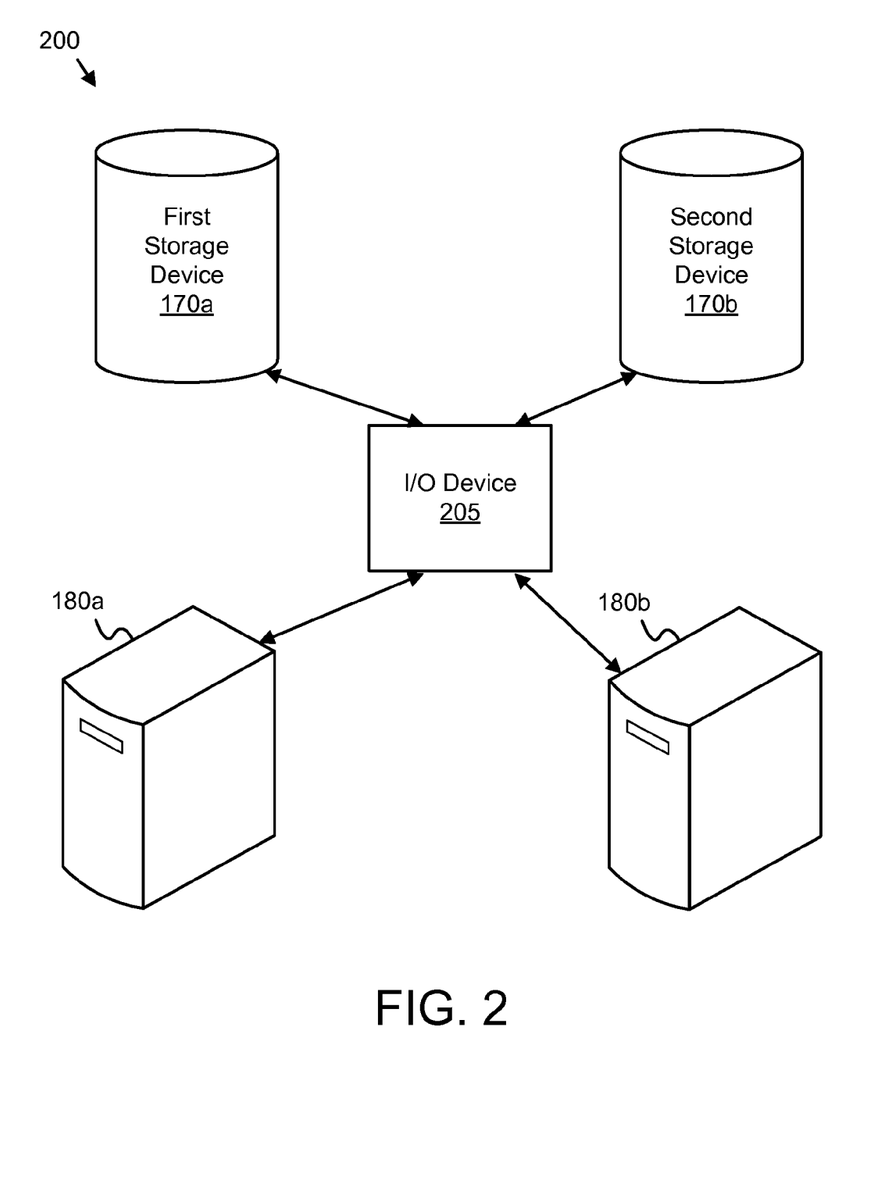
FIG. 2 is a schematic block diagram illustrating one embodiment of storage devices of the present invention.

FIG. 2 is a schematic block diagram illustrating one embodiment of data storages devices 200 of the present invention. The devices 200 include one or more storage devices 170, one or more tape drives 180, and an I/O device 205. The description of the devices 200 refers to elements of FIG. 1, like numbers referring to like elements.

The storage devices 170 and tape drives 180 may each be accessed using a unique storage device name. For example, a first storage device 170a may be accessed using the storage device name "DD972."

The controllers 160 and/or server 130 of FIG. 1 may communicate with the storage devices 170 and tape drives 180 through the I/O device 205. The I/O device 205 may comprise one or more switches. The switches may provide point-to-point connections between devices. In one embodiment, the switches are configured as non-blocking switches. DPS devices may address the I/O device 205 using an I/O device name.

For example, the server 130 may communicate with a first tape drive 180*a* through the I/O device 205. The server 130 may use the I/O device name, an address space for the data, a data set name for the data set storing the data, and a storage device name to access the data. Tracking an access to the storage device 170 may require possession of the I/O device name, the address space, the data set name, and the storage device name.

Unfortunately, such information is often not available to an administrator that wishes to track a data access. The present invention dynamically tracks addresses, and may support diagnostic listings, as will be described hereafter.

Figure 3:
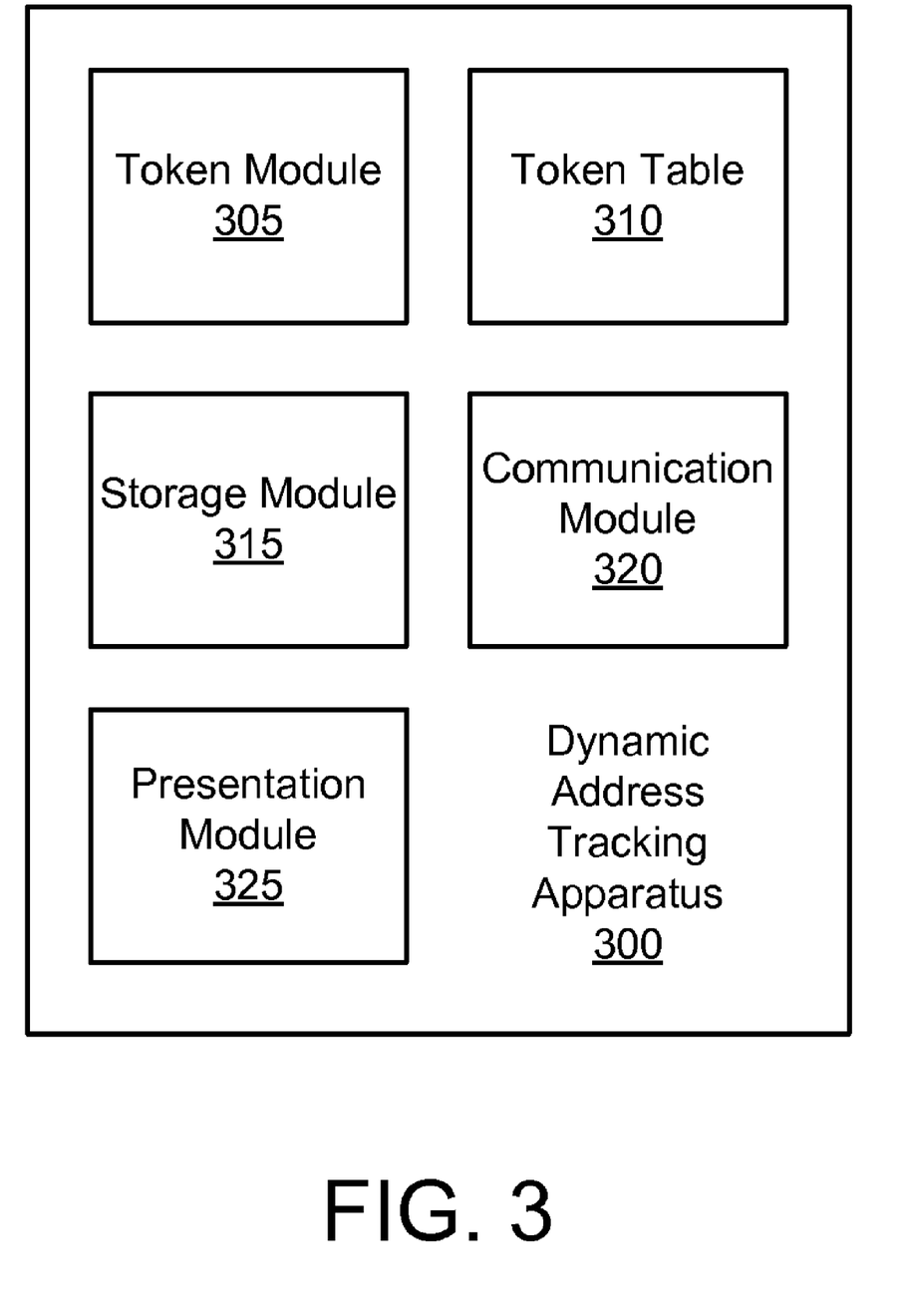
FIG. 3 is a schematic block diagram illustrating one embodiment of a dynamic address tracking apparatus of the present invention.

FIG. 3 is a schematic block diagram illustrating one embodiment of a dynamic address tracking apparatus 300 of the present invention. The apparatus 300 may be embodied by the server 130 of FIG. 1. Alternatively, the apparatus 300 may be embodied by a controller 160 of FIG. 1. The apparatus 300 includes a token module 305, a token table 310, a storage module 315, a communication module 320, and a presentation module 325. The description of the apparatus 300 refers to elements of FIGS. 1-2, like numbers referring to like elements.

The token module 305, storage module 315, communication module 320, and presentation module 325 may each be configured as one or more computer readable programs. Each computer readable program may be stored on a tangible storage device such as a server hard disk drive or a storage device 170. A processor such as a server processor may execute each computer readable program. The communication module 320 may also include electronic components such as an interface to a data bus, buffers, and status registers as is well known to those of skill in the art.

The token module 305 creates a token for a job that accesses data in the storage system 175. The token comprises a job name. The job is a batch job. The storage module 315 stores location information for the data accessed by the job in a token table. The location information is indexed by the token. In addition, the location information includes the I/O device name, the address space, the data set name, and the storage device name for the accessed data.

The communication module 320 receives a diagnostic command comprising the job name. The token module 305 reconstructs the token using the job name. The storage module 315 retrieves the location information indexed by the token in response to the diagnostic command. In one embodiment, the presentation module 325 lists the retrieved location information as a diagnostic data dump. The apparatus 300 dynamically tracks addresses, allowing the administrator to access the location information and the data from batch jobs. The administrator may use the location information and the data for diagnostic purposes, such as determining the cause of a failure and/or error.

Figure 4A:
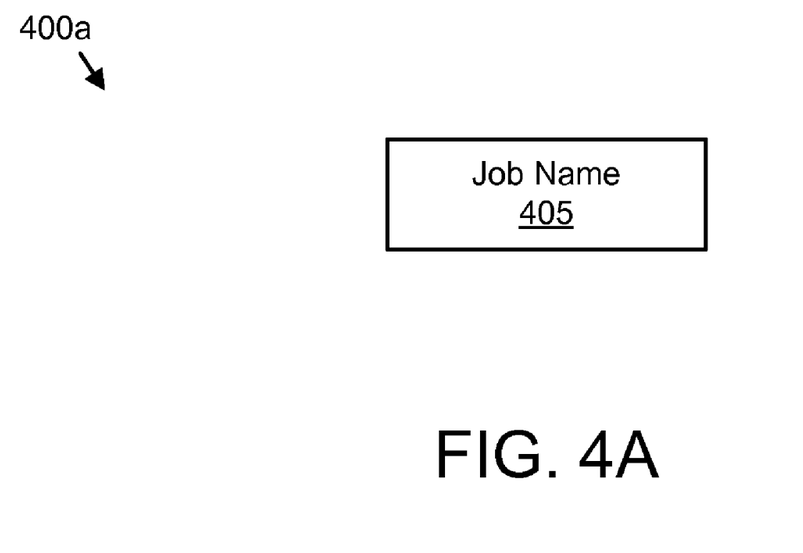
FIG. 4A is a schematic block diagram illustrating one embodiment of a token of the present invention.

FIG. 4A is a schematic block diagram illustrating one embodiment of a token 400*a* of the present invention. The token 400*a* is used as an index to the location information of the token table as will be described hereafter. In the depicted embodiment, the token 400*a* includes the job name 405 for a batch job. In one embodiment the job name 405 is configured as a hash of the original job name.

Figure 4B:
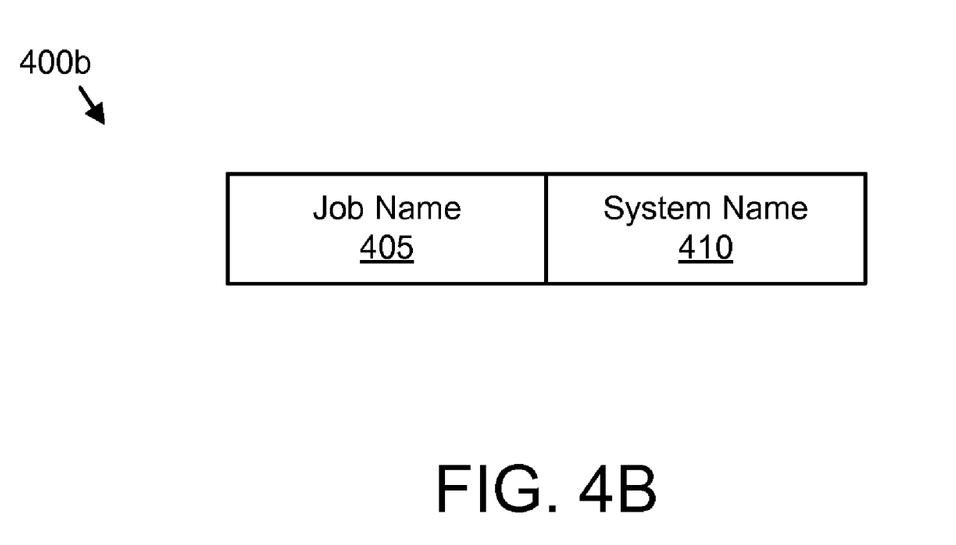
FIG. 4B is a schematic block diagram illustrating one alternate embodiment of a token of the present invention.

FIG. 4B is a schematic block diagram illustrating one alternate embodiment of a token 400*b* of the present invention. As shown in FIG. 4A, the token 400*b* includes the job name 405. In addition, the depicted token 400*b* includes a system name 410. The system name 410 may identify a storage subsystem 140, the storage system 175, or the like. In one embodiment, the token 400*b* is a hash of the job name 405 and system name 410.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
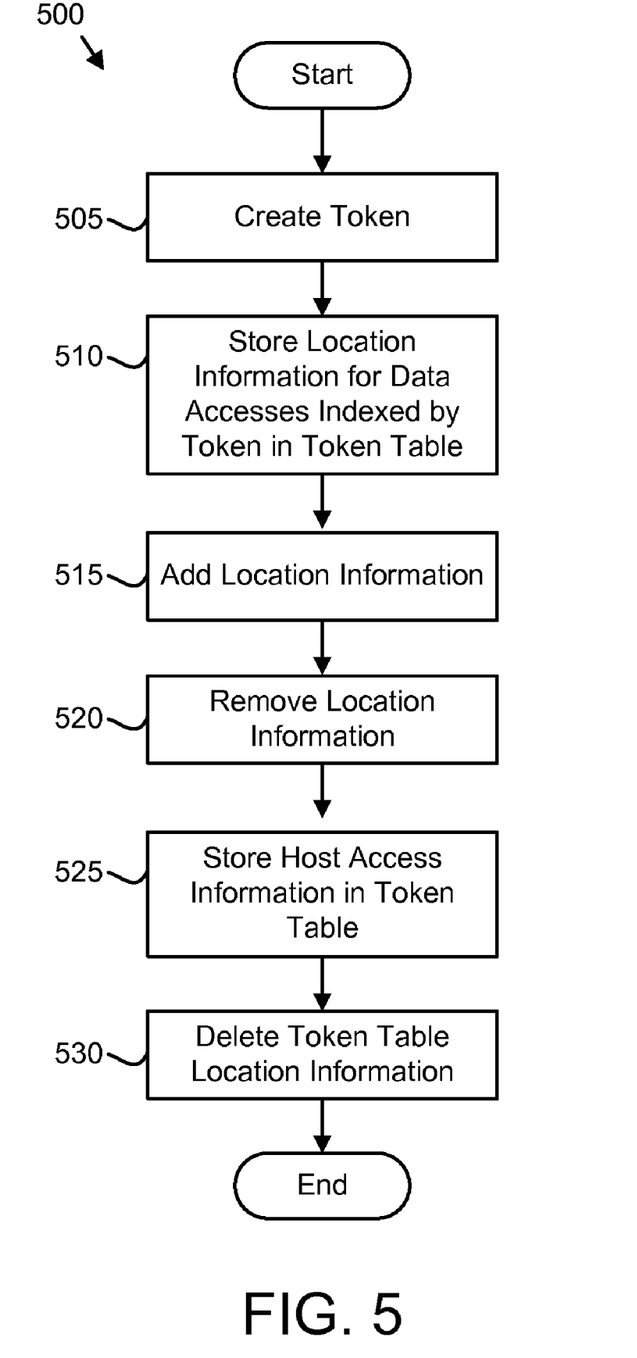
FIG. 5 is a schematic flow chart diagram illustrating one embodiment of an address tracking method of the present invention.

FIG. 5 is a schematic flow chart diagram illustrating one embodiment of an address space tracking method 500 of the present invention. The description of the method refers to elements of FIGS. 1-4B, like numbers referring to like elements. The method 500 substantially includes the steps to carry out the functions presented above with respect to the operation of the described apparatus and system of FIGS. 1-4B. In one embodiment, the method 500 is implemented with a computer program product comprising a tangible storage device having a computer readable program. The computer readable program may be integrated into a computing system, such as the server 130 and/or controller 160, wherein the program in combination with the computing system is capable of performing the method 500.

The token module 305 creates 505 a token 400 for a job that accesses data in the storage system 175. The job is a batch job. In one embodiment, the host 105 executes the batch job, accessing data stored on the storage devices 170. Alternatively, the host 105 may request that the server 130 execute the batch job.

The token 400 comprises a job name 405. The token module 305 may hash the job name 405 as is well known to those of skill in the art. In an alternate embodiment, the token 400 includes a job name 405 and a system name 410.

The storage module 315 stores 510 location information for the data accessed by the job in a token table. The token table will be described in detail hereafter. The location information is indexed by the token 400. In one embodiment, the location information includes the I/O device name, the address space, the data set name, and the storage device name for the accessed data.

In one embodiment, the storage module 315 stores 510 the location information using a SQL command. For example, the storage module 315 may issue a SQL command as illustrated in Table 1 to store 510 the location information. In the tables, "Token_Table" refers to the token table, "Token" refers to a token column in the token table, "Device_name" refers to a storage device name column, Address_space refers to an address space column, "Data_set" refers to a data set column, "Storage_name" refers to a storage system name column, "Token_value" refers to the token 400, "Device- _name_value" refers to a storage device name, "Address_space_value" refers to an address space, "Data_set_value" refers to a data set, and "Storage_name_value" refers to a storage system name.

TABLE 1

INSERT INTO Token_Table (Token, Device_name, Address_space, Data_set, Storage_name) VALUES Token_value, Device_name_value, Address_space_value, Data_set_value, Storage_name_value;

In one embodiment, the storage module 315 adds 515 additional location information indexed by the token 400 to the token table when the job accesses additional address spaces. For example, the host 105 may access additional address spaces in one or more additional storage devices 170. The storage module 315 may add 515 the I/O device name, the address space, the data set name, and the storage device name for the additional accessed address spaces to the token table. The additional location information is accessed by the token 400.

In one embodiment, the storage module 315 removes 520 location information indexed by the token 400 from the token table after an address space is accessed. For example, the storage module 315 may remove the additional location information from the token table after the data referenced by the additional location information is accessed. The storage module 315 may employ a SQL command as illustrated in Table 2 to remove location information for a first address space after the first address space is accessed.

TABLE 2

DELETE FROM Token_Table WHERE (Token = Token_name AND Address_space_value = First_address_space_value;

In one embodiment, the storage module 315 stores 525 access information in the token table that describes the host 110 accessing a data set. The access information may include a host identifier, a path to the host 110, and the like. In one embodiment, the storage module 315 employs a SQL command to store the access information. Table 3 illustrates one example of a SQL command for storing access information. In the tables, "Host_name" refers to a host name column in the token table and "Host_name_value" refers to a host name.

TABLE 3

INSERT INTO Token_Table (Token, Device_Name, Address space, Data_set, Storage_Name, Host_name) VALUES Token_value, Device_name_value, Address space_value, Data_set_value, Storage_name_value, Host_name_value;

In a certain embodiment, the storage module 315 deletes 530 the token table location information indexed by the token 400 when the job ends, and the method 500 terminates. The storage module 315 may employ a SQL command to delete 530 the token table as illustrated in Table 4.

TABLE 4

DELETE FROM Token_Table WHERE Token = Token_name;

The address space tracking method 500 stores location information for the batch job accessing data in the storage system 175. The location information may be retrieved for diagnostic purposes as will be explained hereafter. Thus the location information is available without foreknowledge of the I/O devices 205, storage devices 170, and addresses spaces used by the batch job.

Figure 6:
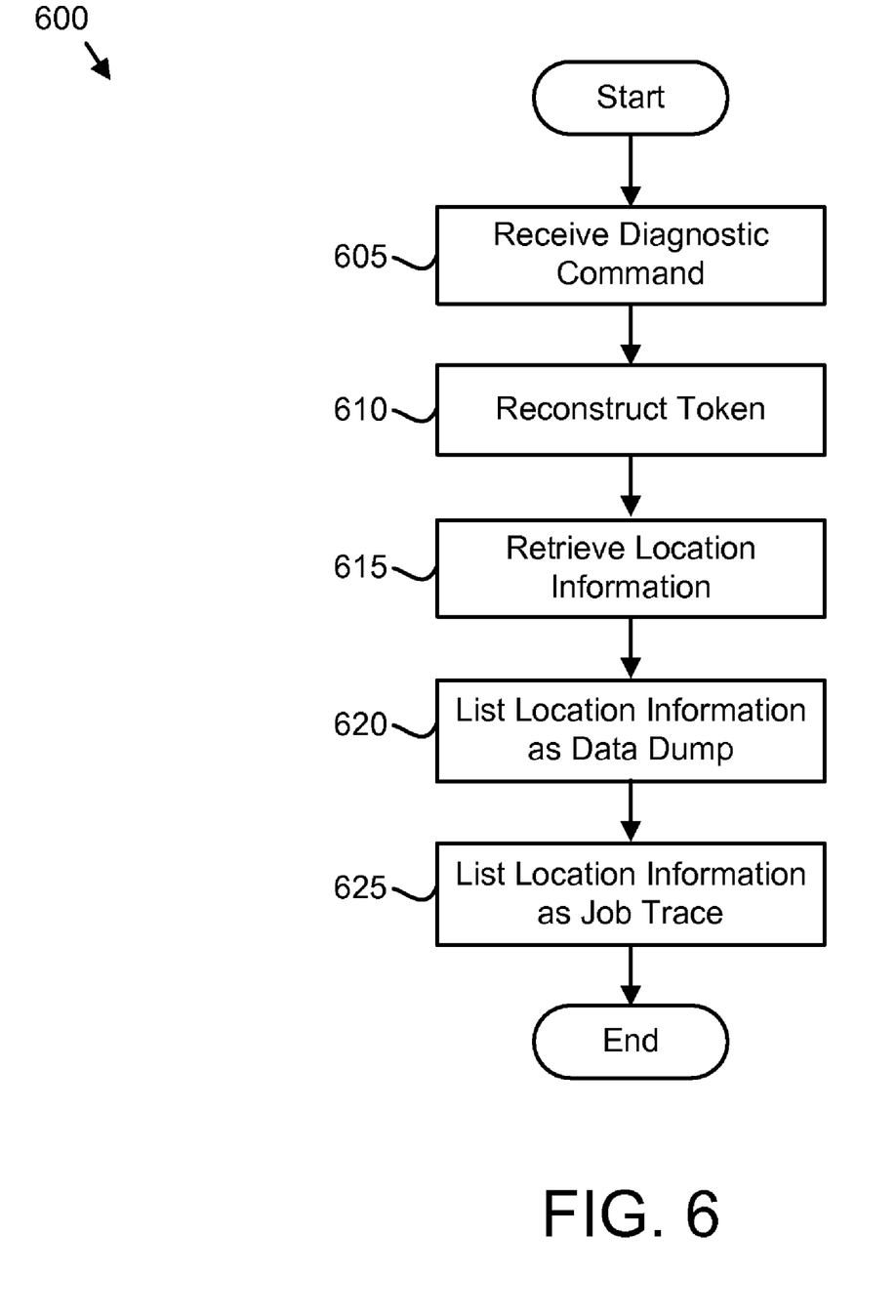
FIG. 6 is a schematic flow chart diagram illustrating one embodiment of an address retrieval method of the present invention.

FIG. 6 is a schematic flow chart diagram illustrating one embodiment of an address retrieval method 600 of the present invention. The description of the method 600 refers to elements of FIGS. 1-5, like numbers referring to like elements. The method 600 substantially includes the steps to carry out the functions presented above with respect to the operation of the described apparatus and system of FIGS. 1-5. In one embodiment, the method 600 is implemented with a computer program product comprising a tangible storage device having a computer readable program. The computer readable program may be integrated into a computing system, such as the server 130 and/or controller 160, wherein the program in combination with the computing system is capable of performing the method 600.

The method 600 begins and the communication module 320 receives 605 a diagnostic command comprising the job name 405. The administrator may communicate the diagnostic command from a workstation to the server 130. In a certain embodiment, the server 130 communicates the diagnostic command to the controller 160.

The token module 305 reconstructs 610 the token using the job name 405. In one embodiment, the token module 305 hashes the job name 405. In a certain embodiment, the token module 305 also hashes the system name 410 and appends the hash of the system name 410 to the token 400. In an alternate embodiment, the token module 305 concatenates the job name 405 and system name 410 and hashes the concatenated name.

The storage module 315 retrieves 615 the location information indexed by the token 400 from the token table in response to the diagnostic command. In one embodiment, the storage module 315 employs a SQL command to retrieve the location information. Table 5 illustrates one embodiment of a SQL for retrieving the location information.

TABLE 5

SELECT Device_name, Address_space, Data_set, Storage_Name
FROM Token_Table
WHERE Token = Token_value;

In one embodiment, the presentation module 325 lists 620 the retrieved location information and the data as a diagnostic data dump. The data dump may list the I/O device 205, storage device 170, address space, and data each storage system access identified by the job name 405. The presentation module 325 may list 620 the retrieved location information and data to a file. The file may be a flat file, an array of linked arrays, or the like. Alternatively, the presentation module 325 may display the list of retrieved location information and data on a monitor.

In one embodiment, the presentation module 325 lists 625 the retrieved location information as a job trace and the method 600 ends. The job trace may show the I/O device 205, storage device 170, address space for each storage system access identified by the job name 405. The presentation module 325 may present the job trace on a monitor. Alternatively, the presentation module 325 may store the job trace to a file.

The address space retrieval method 600 retrieves the location information and data for a data access to the storage system 175 in response to a diagnostic command. In addition, the method 600 lists the location information as a data dump and/or as a job trace, allowing the administrator to review the location information and data although the I/O devices 205, storage devices 170, and address spaces used by the job were not known before the job began.

Figure 7:
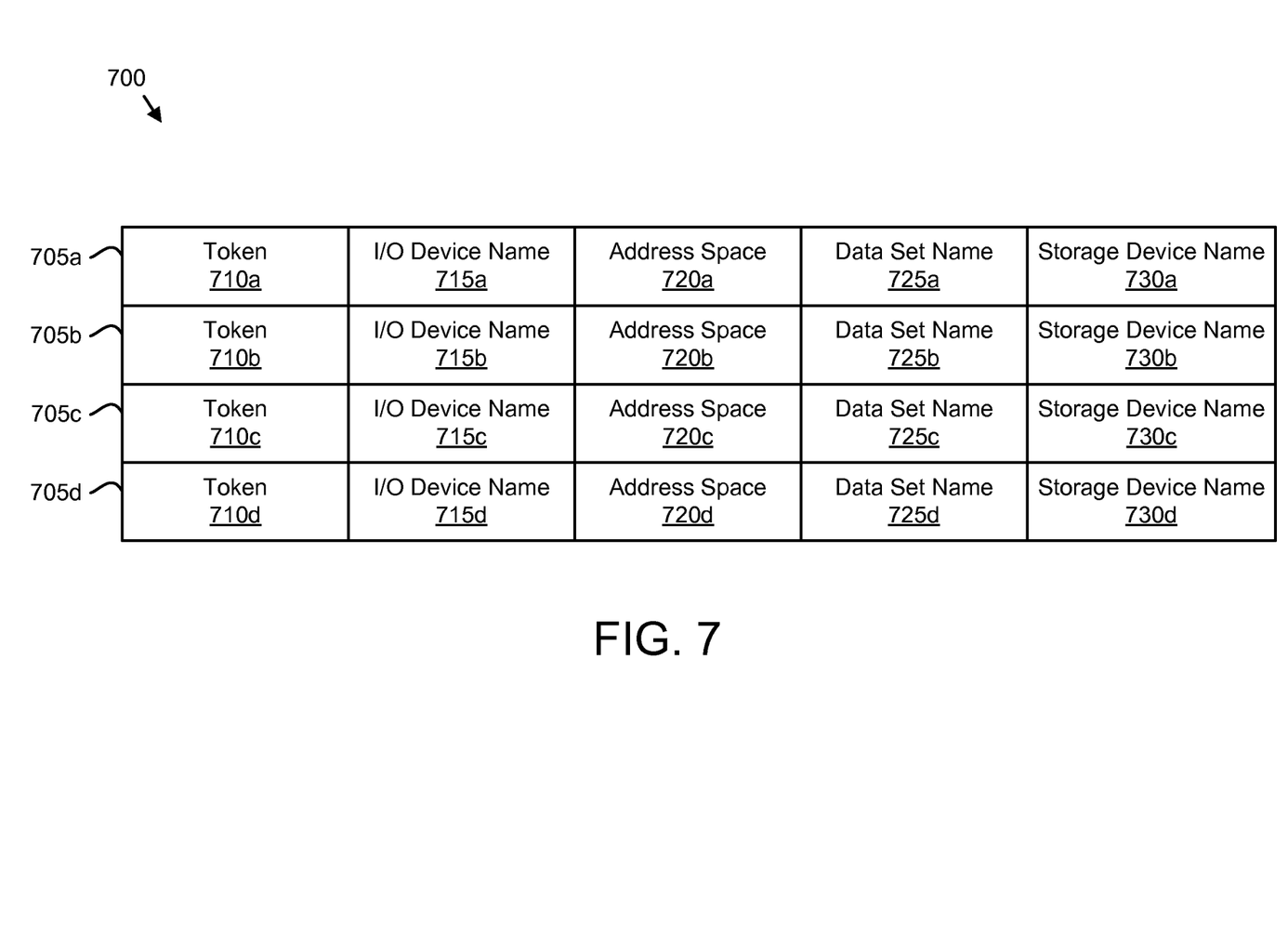
FIG. 7 is a schematic block diagram illustrating one embodiment of a token table of the present invention.

FIG. 7 is a schematic block diagram illustrating one embodiment of a token table 700 of the present invention. The token table 700 may be created by the storage module 315 storing 510 location information for data accesses. The description of the token table 700 refers to elements of FIGS. 1-6, like numbers referring to like elements.

The token table 700 includes a plurality of entries 705. Each entry 705 includes a token 710, an I/O device name 715, an address space 720, a data set name 725, and a storage device name 730. The I/O device name 715, address space 720, data set name 725, and storage device name 730 may each include values for a plurality of I/O device names, address spaces, data set names, and storage device names. The contents of the I/O device name 715, address space 720, data set name 725, and storage device name 730 dynamically change to reflect the resources currently used by the job as the job executes.

The token table 700 may be stored in a flat file, with each entry 705 delimited by a carriage return character, an enter character, or the like. In addition, the token device name 715, address space 720, data set name 725, and storage device name 730 may each be separated by a delimiter such as a comma, a semicolon, a tab, or the like.

The token table 700 may also be organized as a database table as is well known to those of skill in the art. In one embodiment, each entry 705 is organized as an array of data fields. The token 710, I/O device name 715, address space 720, data set name 725, and storage device name 730 may each be stored in a distinct data field. Each entry 705 may include pointers linking the entry 705 to a proceeding and a succeeding entry 705.

Figure 8:
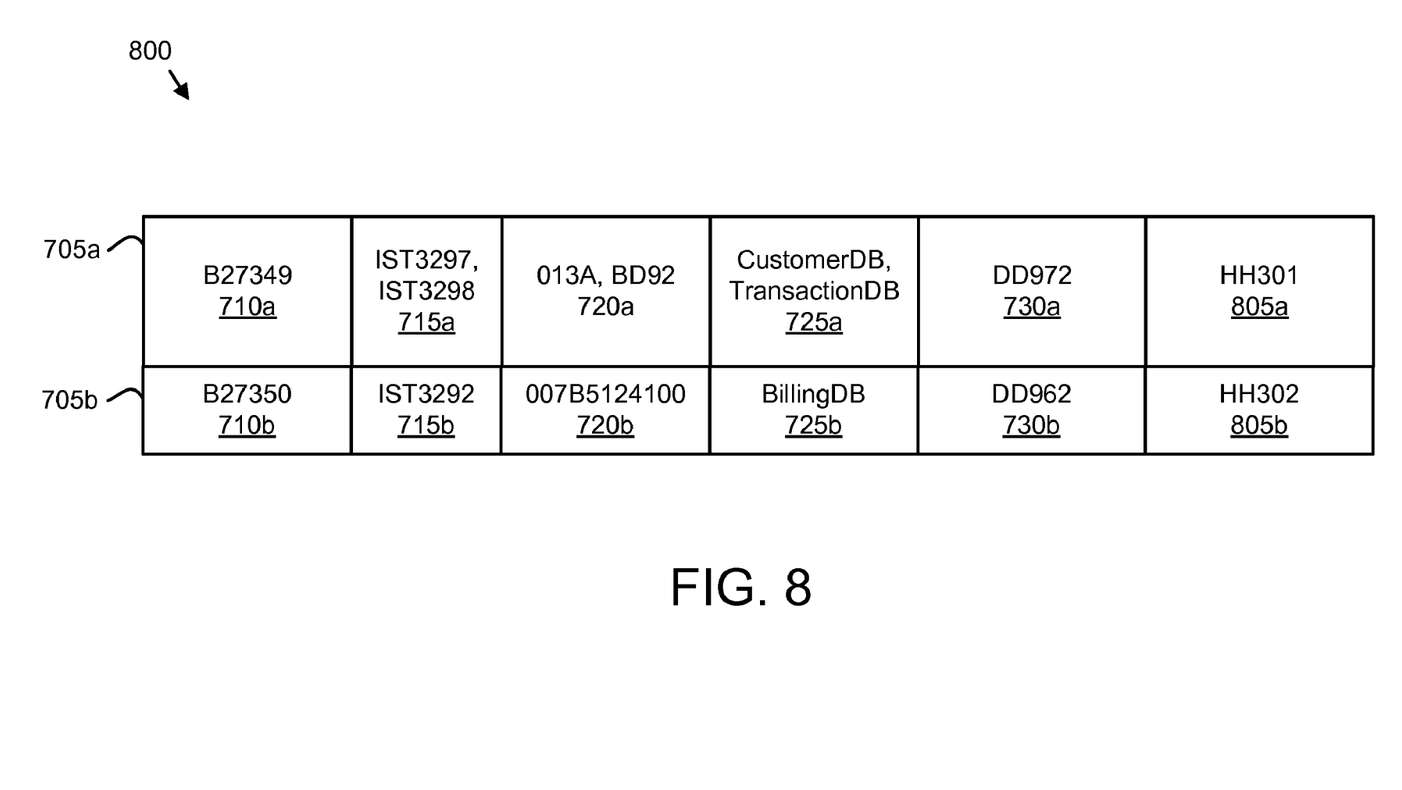
FIG. 8 is a schematic block diagram illustrating one embodiment of token table data of the present invention.

FIG. 8 is a schematic block diagram illustrating one embodiment of token table data 800 of the present invention. The token table 700 of FIG. 7 is shown populated with data values for the token 710, I/O device name 715, address space 720, data set name 725, and storage device name 730. In addition, each entry 705 includes a host data value 805.

In one example, the storage module 315 may store 510 a first entry 705a by issuing a SQL command as illustrated in Table 6. The I/O device name 715, address space 720, data set name 725 may each comprise a plurality of columns differentiated by a number.

TABLE 6

INSERT INTO Token_Table (Token, Device_name, Address_space_1, Address_space_2, Data_set_1, Data_set_2, Storage_Name, Host_name) VALUES B27349, IST3297, IST3298, 013A, BD92, CustomerDB, TransactionDB, DD972, HH301;

After the data access of the job represented by the token B27349 710a is complete, the storage module 315 may delete 530 the token table entries 705 for the token B27349 using a SQL command as illustrated in Table 7.

TABLE 7

DELETE FROM Token_Table WHERE Token = B27349;

The present invention employs a token table 700 to dynamically track addresses. In addition, the present invention may support data dumps and job traces using the token table. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a tangible storage device having a computer readable program, wherein the computer readable program when executed on a computer causes the computer to:
  create a token for a job that accesses data in a storage system comprising a plurality of storage devices, wherein the token comprises a job name and the job is a batch job;
  store location information for the data accessed by the job in a token table, wherein the location information is indexed by the token and includes an input/output (I/O) device name, an address space, a data set name, and a storage device name;
  receive a diagnostic command comprising the job name;
  reconstruct the token using the job name; and
  retrieve the location information indexed by the token in response to the diagnostic command.

2. The computer program product of claim 1, wherein the computer readable program is further configured to cause the computer to retrieve the data using the retrieved location information.

3. The computer program product of claim 1, wherein the computer readable program is configured to cause the computer to delete the token table location information indexed by the token when the job ends.

4. The computer program product of claim 1, wherein the computer readable program is further configured to cause the computer to add location information indexed by the token to the token table when the job accesses additional address spaces.

5. The computer program product of claim 1, wherein the computer readable program is further configured to cause the computer to remove location information indexed by the token from the token table after an address space is accessed.

6. The computer program product of claim 1, wherein the computer readable program is further configured to cause the computer to list the retrieved location information as a diagnostic data dump.

7. The computer program product of claim 6, wherein the computer readable program is further configured to cause the computer to list the data with the retrieved location information.

8. The computer program product of claim 1, wherein the computer readable program is further configured to cause the computer to list the retrieved location information as a job trace.

9. The computer program product of claim 1, wherein the token further comprises a system name.

10. The computer program product of claim 1, wherein the computer readable program is further configured to cause the computer to store access information in the token table that describes a host accessing a data set.

11. An apparatus for dynamic address tracking, the apparatus comprising:
  a token module comprising a computer readable program stored on a tangible storage device, executed by a processor, and configured to create a token for a job that accesses data in a storage system comprising a plurality of storage devices, wherein the token comprises a job name and the job is a batch job;

a storage module comprising a computer readable program stored on the tangible storage device, executed by the processor, and configured to store location information for the data accessed by the job in a token table, wherein the location information is indexed by the token and includes an I/O device name, an address space, a data set name, and a storage device name;

a communication module comprising electrical components and a computer readable program stored on a tangible storage device, executed by a processor, and configured to receive a diagnostic command comprising the job name;

the token module further configured to reconstruct the token using the job name; and the storage module further configured to retrieve the location information indexed by the token in response to the diagnostic command.

12. The apparatus of claim 11, wherein the storage module is further configured to retrieve the data using the retrieved location information.

13. The apparatus of claim 12, further comprising a presentation module comprising a computer readable program stored on the tangible storage device, executed by the processor, and configured to list the retrieved location information and data as a diagnostic data dump.

14. The apparatus of claim 13, wherein the presentation module is further configured to list the data with the retrieved location information.

15. The apparatus of claim 13, wherein the presentation module is further configured to list the retrieved location information as a job trace.

16. The apparatus of claim 11, wherein the storage module is further configured to delete the token table location information indexed by the token when the job ends.

17. The apparatus of claim 11, wherein the storage module is further configured to add location information indexed by the token to the token table when the job accesses additional address spaces.

18. The apparatus of claim 11, wherein the storage module is further configured to remove location information indexed by the token from the token table after an address space is accessed.

19. A method for deploying computer infrastructure, comprising integrating a computer readable program stored on a tangible storage device into a computing system, wherein the program in combination with the computing system is capable of performing the following:

creating a token for a batch job that accesses data in a storage system comprising a plurality of storage devices, wherein the token comprises a job name;

storing location information for the data accessed by the batch job in a token table, wherein the location information is indexed by the token and includes an I/O device name, an address space, a data set name, and a storage device name;

receiving a diagnostic command comprising the job name;
reconstructing the token using the job name; and
retrieving the location information indexed by the token in response to the diagnostic command.

20. The method of claim 19, further comprising retrieving the data using the retrieved location information.

21. The method of claim 20, further comprising listing the retrieved location information and data as a diagnostic data dump.

22. The method of claim 19, further comprising deleting the token table location information indexed by the token when the batch job ends.

23. The method of claim 19, further comprising adding location information indexed by the token to the token table when the job accesses additional address spaces and removing location information indexed by the token from the token table after an address space is accessed.

24. A system for dynamic address space tracing, the system comprising:

a host;

a storage system comprising a plurality of storage devices and configured to store data sets for the host;

a server with computer readable programs stored on a tangible storage device, executed by a processor, and comprising a token module configured to create a token for a job that accesses data in the storage system, wherein the token comprises a job name and the job is a batch job;

a storage module configured to store location information for the data accessed by the job in a token table, wherein the location information is indexed by the token and includes an I/O device name, an address space, a data set name, and a storage device name;

communication module configured to receive a diagnostic command comprising the job name;

the token module further configured to reconstruct the token using the job name;

the storage module further configured to retrieve the location information indexed by the token and retrieve the data using the location information in response to the diagnostic command; and the storage module further configured to delete the token table location information indexed by the token when the job ends.

25. The system of claim 24, wherein the storage module is further configured to add location information indexed by the token to the token table when the job accesses additional address spaces.

26. The system of claim 24, wherein the storage module is further configured to remove location information indexed by the token from the token table after an address space is accessed.

27. The system of claim 24, wherein the storage module is further configured to store access information in the token table that describes the host accessing a data set.

28. The system of claim 24, the server further comprising a presentation module configured to list the retrieved location information and data as a diagnostic data dump.

29. A computer program product comprising a computer useable medium having a computer readable program stored on a tangible storage device, wherein the computer readable program when executed on a computer causes the computer to:

create a token for a job that accesses data in a storage system comprising a plurality of storage devices, wherein the token comprises a job name and the job is a batch job;

store location information for the data accessed by the job in a token table, wherein the location information is indexed by the token and includes an I/O device name, an address space, a data set name, and a storage device name;

add location information indexed by the token to the token table when the job accesses additional address spaces;

remove location information indexed by the token from the token table after an address space is accessed;

store access information that describes a host accessing a data set in the token table;

receive a diagnostic command comprising the job name;

reconstruct the token using the job name;
retrieve the location information indexed by the token in response to the diagnostic command;
retrieve the data using the retrieved location information;
list the retrieved location information as a diagnostic data dump; and
delete the token table location information indexed by the token when the job ends.

30. A method for deploying computer infrastructure, comprising integrating a computer readable program stored on an tangible storage device into a computing system, wherein the program in combination with the computing system is capable of performing the following:

creating a token for a job that accesses data in a storage system comprising a plurality of storage devices, wherein the token comprises a job name and a system name and the job is a batch job;
storing location information for the data accessed by the job in a token table, wherein the location information is indexed by the token and includes an I/O device name, an address space, a data set name, and a storage device name;
adding location information indexed by the token when the job accesses additional address spaces;
removing location information indexed by the token after an address space is accessed;
storing access information that describes a host accessing a data set in the token table;
receiving a diagnostic command comprising the job name;
reconstructing the token using the job name;
retrieving the location information indexed by the token in response to the diagnostic command;
retrieving the data using the retrieved location information;
listing the retrieved location information as a job trace; and
deleting the token table location information indexed by the token when the job ends.

\* \* \* \* \*